(12) United States Patent
Yoshida et al.

(10) Patent No.: US 12,522,178 B2
(45) Date of Patent: Jan. 13, 2026

(54) UNLOCKING SYSTEM AND CONTROL METHOD OF UNLOCKING SYSTEM, CONTROL DEVICE AND CONTROL METHOD OF CONTROL DEVICE, AND DETERMINATION DEVICE AND DETERMINATION METHOD

(71) Applicant: Robert Bosch GmbH, Stuttgart (DE)

(72) Inventors: Susumu Yoshida, Kanagawa (JP); Yuka Mizunashi, Tokyo (JP)

(73) Assignee: Robert Bosch GmbH, Stuttgart (DE)

( * ) Notice: Subject to any disclaimer, the term of this patent is extended or adjusted under 35 U.S.C. 154(b) by 53 days.

(21) Appl. No.: 18/042,556

(22) PCT Filed: Aug. 16, 2021

(86) PCT No.: PCT/IB2021/057521
§ 371 (c)(1),
(2) Date: Feb. 22, 2023

(87) PCT Pub. No.: WO2022/043821
PCT Pub. Date: Mar. 3, 2022

(65) Prior Publication Data
US 2023/0356693 A1 Nov. 9, 2023

(30) Foreign Application Priority Data
Aug. 31, 2020 (JP) .............................. 2020-145299

(51) Int. Cl.
*B60R 25/24* (2013.01)
*G07C 9/00* (2020.01)
*H04B 17/318* (2015.01)

(52) U.S. Cl.
CPC ........ *B60R 25/245* (2013.01); *G07C 9/00309* (2013.01); *H04B 17/318* (2015.01);
(Continued)

(58) Field of Classification Search
CPC .............. B60R 25/245; H04B 17/318; G07C 9/00309; G07C 2009/00793; G07C 2209/63
See application file for complete search history.

(56) References Cited

U.S. PATENT DOCUMENTS

2019/0143942 A1* 5/2019 Neuhoff ............. G07C 9/00309
340/5.72
2020/0010050 A1* 1/2020 Spick ...................... E05F 15/00
(Continued)

FOREIGN PATENT DOCUMENTS

JP 2019158765 A 9/2019
JP 2020051970 A 4/2020

OTHER PUBLICATIONS

English Translation of JP 2014206496 (Year: 2014).*
International Search Report and Written Opinion for Application No. PCT/IB2021/057521 dated Nov. 5, 2021 (10 pages).

*Primary Examiner* — Patrick N Edouard
*Assistant Examiner* — Eboni N Giles
(74) *Attorney, Agent, or Firm* — Michael Best & Friedrich LLP

(57) ABSTRACT

There is provided an unlocking system capable of improving convenience of a user. An unlocking system 100 includes: a DK acquisition unit 30*a* that acquires strength information RI on strength of radio waves of a wireless signal received by receiving antennas 20*a* to 20*e*; and a DK execution unit 30*b* and an unlocking execution unit 40*b* that execute a shielded state determining process Sa, a region determining process Sb, and an unlocking control process Sc as an unlocking process of controlling release of a lock 21, the DK execution unit 30*b* acquires shielding information SI on a shielded state of a wireless terminal 10 based on the strength information RI in the shielded state determining process Sa, and corrects the strength information RI by using the shielding information SI in the region determining process Sb, and
(Continued)

the unlocking execution unit 40*b* executes control for releasing the lock 21 based on region information ZI acquired based on the corrected strength information RI in the unlocking control process Sc.

12 Claims, 6 Drawing Sheets

(52) U.S. Cl.
CPC .............. *G07C 2009/00793* (2013.01); *G07C 2209/63* (2013.01)

(56) References Cited

U.S. PATENT DOCUMENTS

2020/0033463 A1\* 1/2020 Lee ........................ G01S 11/06
2020/0233072 A1    7/2020 Osai et al.

\* cited by examiner

[FIG. 1]
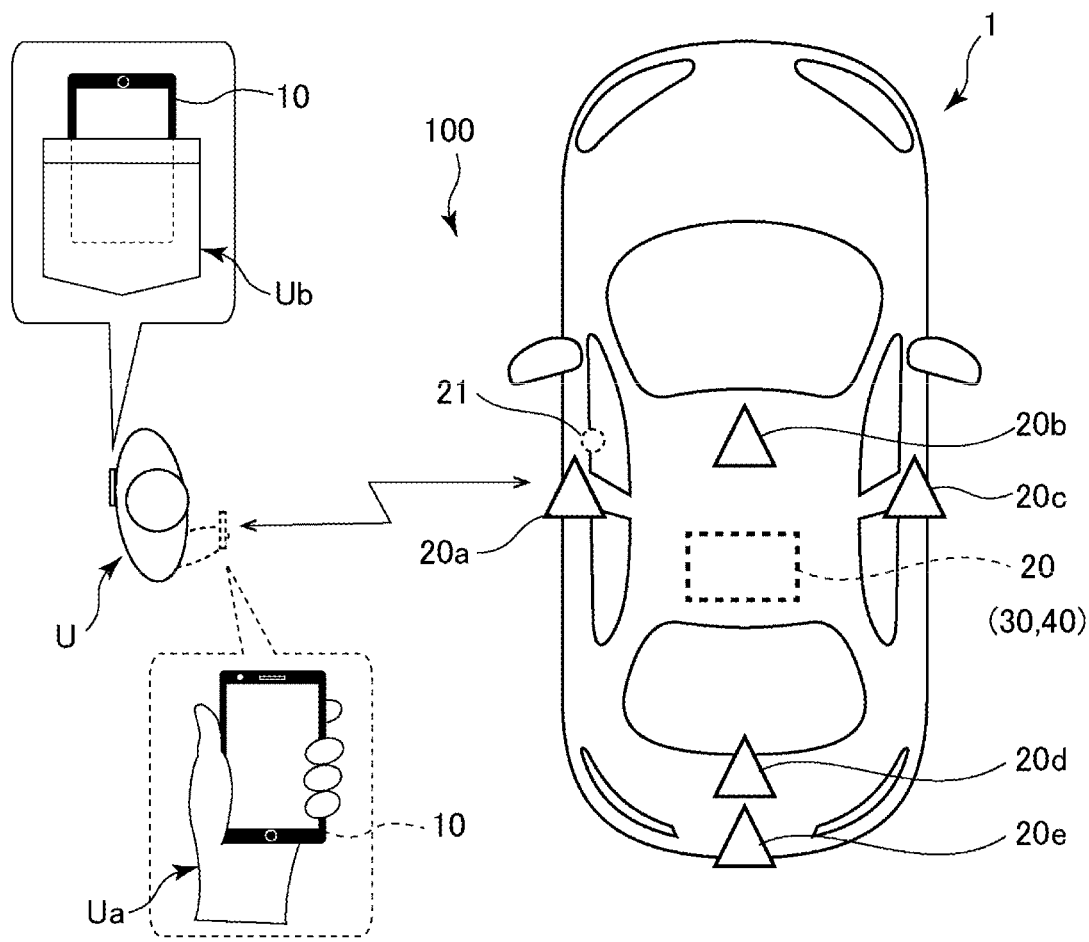
[FIG. 2]
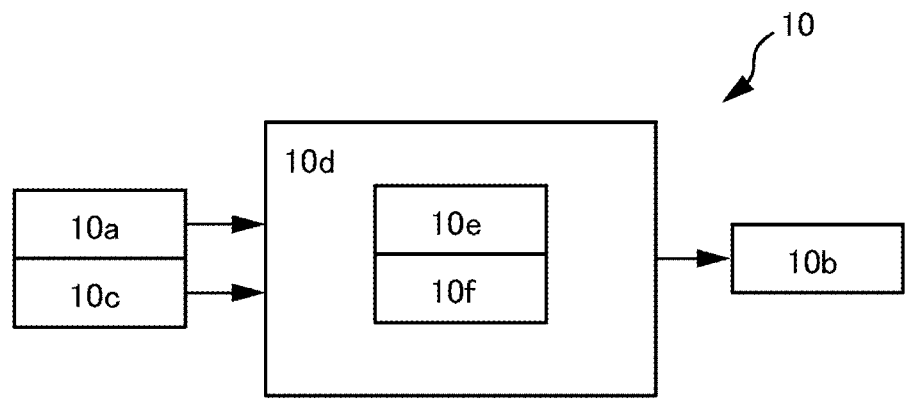

[FIG. 3]
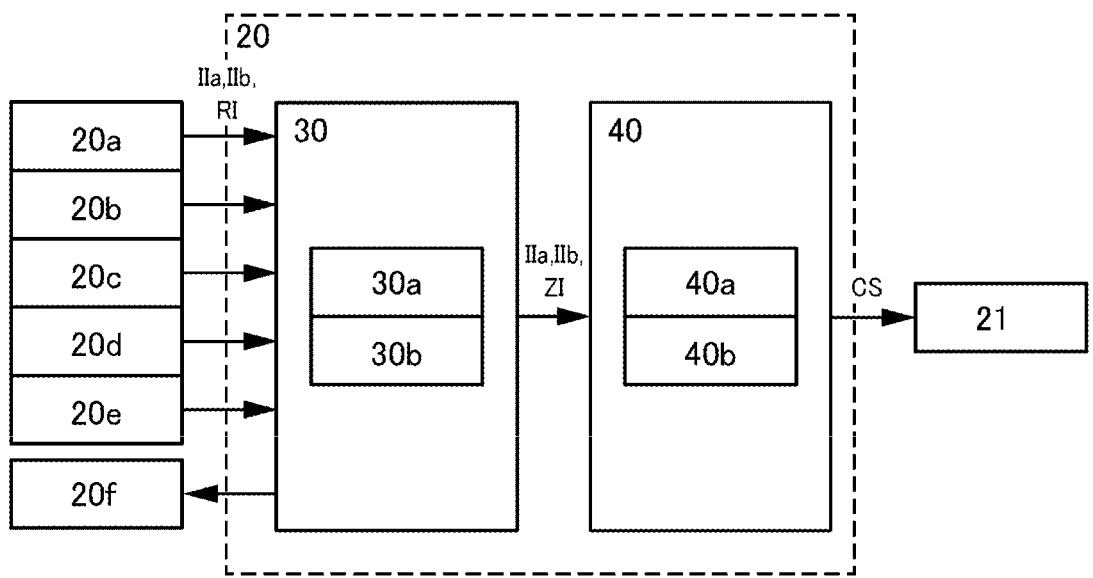

[FIG. 4]
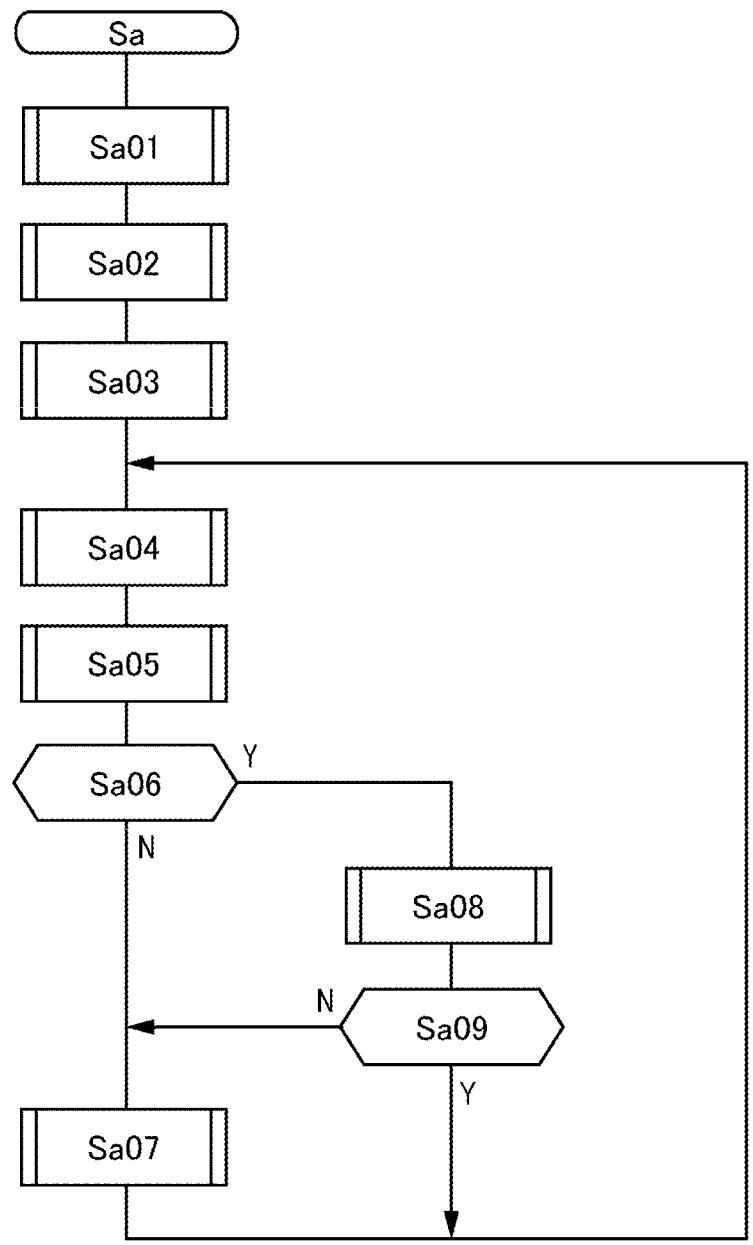

[FIG. 5]
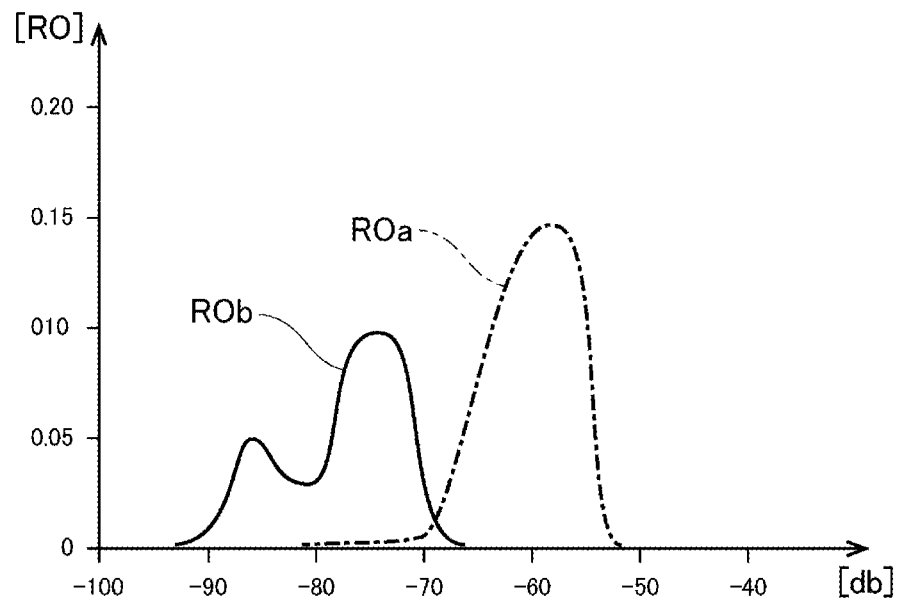
[FIG. 6]
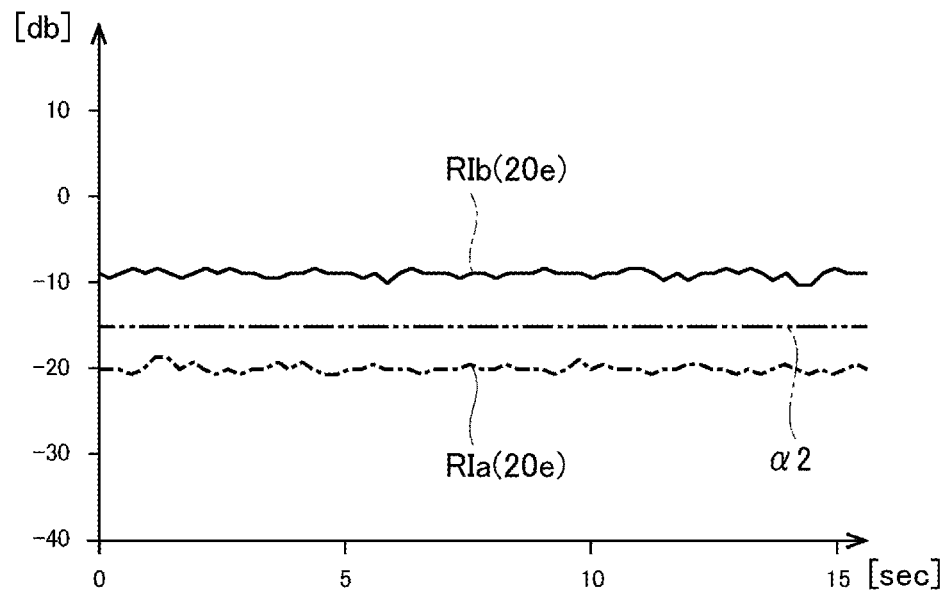

[FIG. 7]
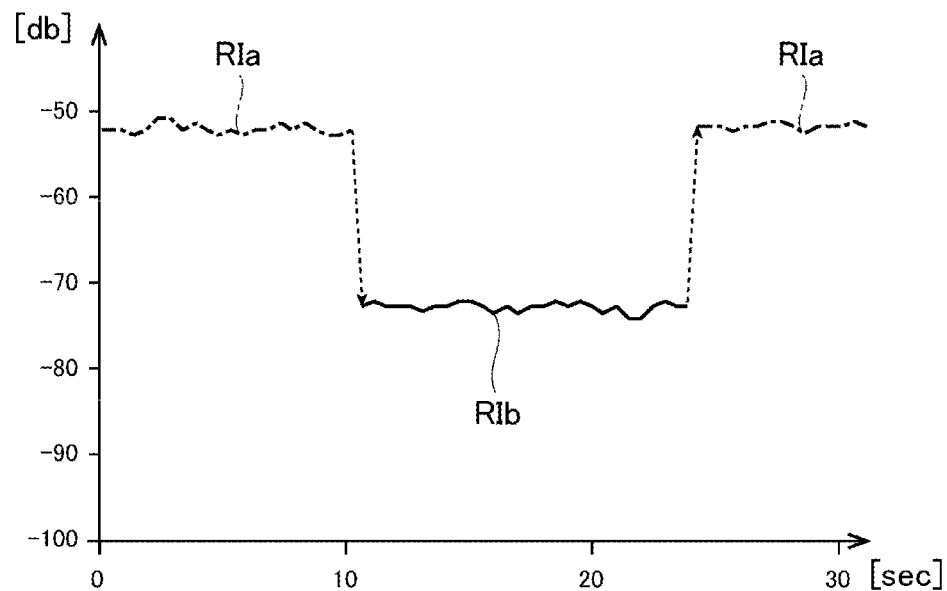
[FIG. 8]
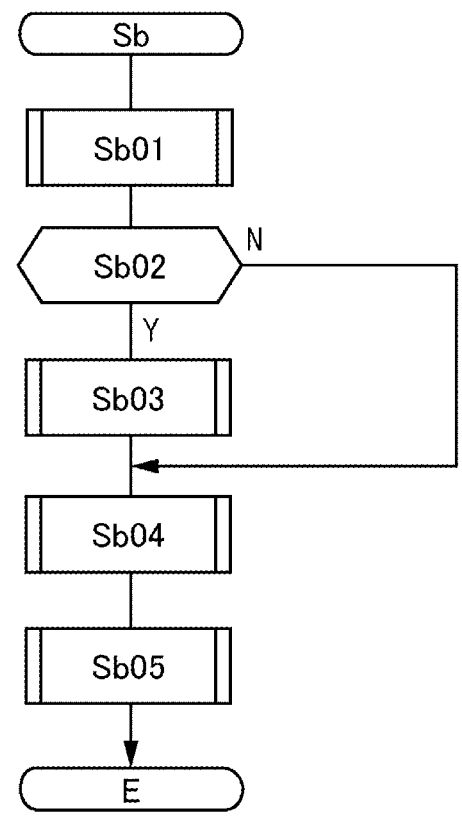

[FIG. 9]
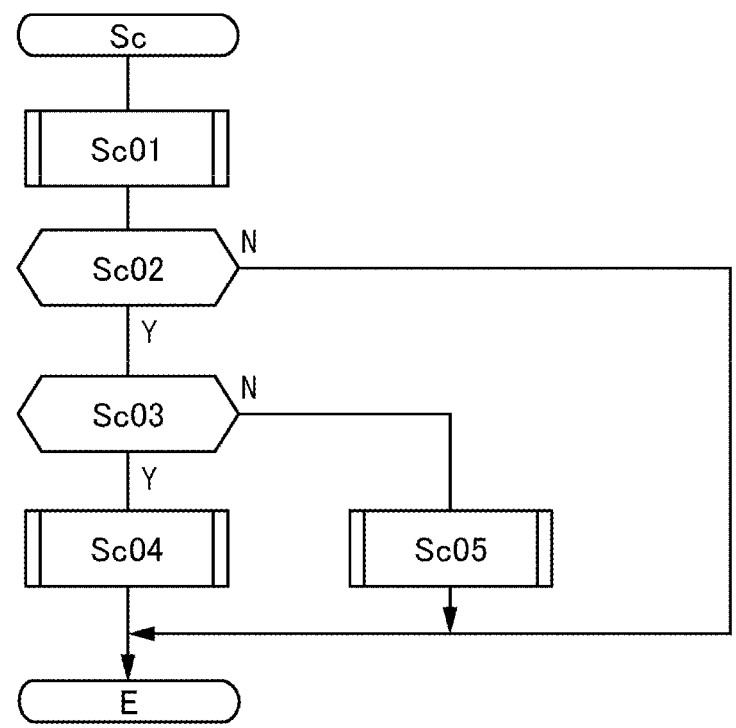

UNLOCKING SYSTEM AND CONTROL METHOD OF UNLOCKING SYSTEM, CONTROL DEVICE AND CONTROL METHOD OF CONTROL DEVICE, AND DETERMINATION DEVICE AND DETERMINATION METHOD

BACKGROUND OF THE INVENTION

The present invention relates to an unlocking system for releasing a lock and a control method of the unlocking system, a control device for controlling release of the lock and a control method of the control device, a determination device for determining a shielded state of a wireless terminal and a determination method for determining the shielded state of the wireless terminal.

In the related art, as an unlocking system for releasing a lock based on a wireless signal from a wireless terminal, for example, there is a system in which the wireless signal is transmitted and received via radio waves between a portable device carried by a user and an in-vehicle device provided to a vehicle, a positional relationship between the portable device and the vehicle is determined based on a strength of radio waves of the wireless signal received by the in-vehicle device, and a lock of a door of the vehicle is released based on the positional relationship (see JP-2020 051970).

In the technology described in JP-2020 051970, for example, in a case where a shielding body (for example, a body of a user who carries the portable device) that shields radio waves exists between the portable device and the vehicle, the accuracy of determining the positional relationship between the portable device and the vehicle deteriorates, and accordingly, a situation occurs in which the lock of the door is not released even when an actual positional relationship satisfies a predetermined condition, and there is a concern that the convenience of the user deteriorates.

SUMMARY OF THE INVENTION

The present invention has been made against the background of the above-described problems, and an object of the present invention is to provide an unlocking system capable of improving the convenience of the user.

According to an aspect of the present invention, there is provided an unlocking system (100) that receives a wireless signal transferred via radio waves from a wireless terminal (10) by antennas (20a to 20e) and controls release of a lock (21) based on the wireless signal, the system including: an acquisition unit (30a) that acquires strength information (RI) on strength of radio waves of the wireless signal received by the antennas (20a to 20e); and execution units (30b, 40b) that execute an unlocking process of controlling the release of the lock (21), in which, in the unlocking process, the execution units (30b, 40b) acquire shielding information (SI) on a shielded state of the wireless terminal (10) based on the strength information (RI), and execute control for releasing the lock (21) based on strength information corrected by using the shielding information (SI).

According to such a configuration, in the unlocking system, the execution unit executes the control for releasing the lock based on the strength information corrected by using the shielding information, and accordingly, it is possible to improve the accuracy of unlocking according to the shielded state of the wireless terminal, and to improve the convenience of the user.

According to another aspect of the present invention, there is provided a control method of an unlocking system (100) that receives a wireless signal transferred via radio waves from a wireless terminal (10) by antennas (20a to 20e) and controls release of a lock (21) based on the wireless signal, the method including: a step of acquiring strength information (RI) on radio wave strength of the wireless signal received by the antennas (20a to 20e), by an acquisition unit (30a); and a step of executing an unlocking process of controlling the release of the lock (21), by execution units (30b, 40b), in which, in the unlocking process, the execution units (30b, 40b) acquire shielding information (SI) on a shielded state of the wireless terminal (10) based on the strength information (RI), and execute control for releasing the lock (21) based on strength information (RIc) corrected by using the shielding information (SI).

According to such a configuration, in the control method of the unlocking system, the execution unit executes the control for releasing the lock based on the strength information corrected by using the shielding information, and accordingly, it is possible to improve the accuracy of unlocking according to the shielded state of the wireless terminal, and to improve the convenience of the user.

According to still another aspect of the present invention, there is provided a control device (30) that controls release of a lock (21) based on a wireless signal transmitted from a wireless terminal (10), transferred via radio waves, and received by antennas (20a to 20e), the device including: an acquisition unit (30a) that acquires strength information (RI) on radio wave strength of the wireless signal received by the antennas (20a to 20e); and an execution unit (30b) that executes an unlocking process of controlling the release of the lock (21), in which, in the unlocking process, the execution unit (30b) acquires shielding information (SI) on a shielded state of the wireless terminal (10) based on the strength information (RI), and executes control for outputting information related to control of the release of the lock (21) based on strength information (RIc) corrected by using the shielding information (SI).

According to such a configuration, in the control device, the execution unit executes the control for releasing the lock based on the strength information corrected by using the shielding information, and accordingly, it is possible to improve the accuracy of unlocking according to the shielded state of the wireless terminal, and to improve the convenience of the user.

According to still another aspect of the present invention, there is provided a control method of a control device (30) that controls release of a lock (21) based on a wireless signal transmitted from a wireless terminal (10), transferred via radio waves, and received by antennas (20a to 20e), the method including: a step of acquiring strength information (RI) on radio wave strength of the wireless signal received by the antennas (20a to 20e), by an acquisition unit (30a); and a step of executing an unlocking process of controlling the release of the lock (21), by an execution unit (30b), in which, in the unlocking process, the execution unit (30b) acquires shielding information (SI) on a shielded state of the wireless terminal (10) based on the strength information (RI), and executes control for outputting information related to control of the release of the lock (21) based on strength information (RIc) corrected by using the shielding information (SI).

According to such a configuration, in the control method of the control device, the execution unit executes the control for releasing the lock based on the strength information corrected by using the shielding information, and accordingly, it is possible to improve the accuracy of unlocking according to the shielded state of the wireless terminal, and to improve the convenience of the user.

According to still another aspect of the present invention, there is provided a determination device (30) for receiving a wireless signal transferred via radio waves from a wireless terminal (10) by antennas (20a to 20e), and determining a shielded state of the wireless terminal (10) based on radio wave strength at the antennas (20a to 20e) of the wireless signal, the device including: an acquisition unit (30a) that acquires strength information (RI) on the radio wave strength of the wireless signal received by the antennas (20a to 20e); and an execution unit (30b) that executes a determining process of determining a shielded state of the wireless terminal (10), in which, in the determining process, the execution unit (30b) analyzes appearance frequency distribution of the radio wave strength based on the strength information (RI), and determines that the wireless terminal (10) is in the shielded state of being shielded by a shielding body at least in a case where a shape of the appearance frequency distribution is a reference shape, analyzes the appearance frequency distribution of the radio wave strength based on the strength information (RI), and determines that the wireless terminal (10) is in the shielded state of being shielded by the shielding body in a case where the shape of the appearance frequency distribution is not the reference shape and in a case where it is specified based on the strength information (RI) that the radio wave strength at the antennas (20a to 20e) exceeds a first reference amount (α1) and deteriorates, and analyzes the appearance frequency distribution of the radio wave strength based on the strength information (RI), and determines that the wireless terminal (10) is not in the shielded state of being shielded by the shielding body in a case where the shape of the appearance frequency distribution is not the reference shape and in a case where it is not specified based on the strength information (RI) that the radio wave strength at the antenna exceeds the first reference amount and deteriorates.

According to such a configuration, the determination device can determine the shielded state where the wireless terminal is shielded by the shielding body, and can improve the convenience of the user.

According to still another aspect of the present invention, there is provided a determination method for receiving a wireless signal transferred via radio waves from a wireless terminal (10) by antennas (20a to 20e), and determining a shielded state of the wireless terminal (10) based on radio wave strength at the antennas (20a to 20e) of the wireless signal, the method including: a step of acquiring strength information (RI) on the radio wave strength of the wireless signal received by the antennas (20a to 20e), by an acquisition unit (30a); and a step of executing a shielded state determining process of determining a shielded state of the wireless terminal (10), by an execution unit (30b), in which, in the determining process, the execution unit (30b) analyzes appearance frequency distribution of the radio wave strength based on the strength information (RI), and determines that the wireless terminal (10) is in the shielded state of being shielded by a shielding body at least in a case where a shape of the appearance frequency distribution is a reference shape, analyzes the appearance frequency distribution of the radio wave strength based on the strength information (RI), and determines that the wireless terminal (10) is in the shielded state of being shielded by the shielding body in a case where the shape of the appearance frequency distribution is not the reference shape and in a case where it is specified based on the strength information (RI) that the radio wave strength at the antennas (20a to 20e) exceeds a first reference amount (α1) and deteriorates, and analyzes the appearance frequency distribution of the radio wave strength based on the strength information (RI), and determines that the wireless terminal (10) is not in the shielded state of being shielded by the shielding body in a case where the shape of the appearance frequency distribution is not the reference shape and in a case where it is not specified based on the strength information (RI) that the radio wave strength at the antenna exceeds the first reference amount and deteriorates.

According to such a configuration, in the determination method, it is possible to determine the shielded state where the wireless terminal is shielded by the shielding body, and to improve the convenience of the user.

The present invention may have only the invention-specific matters described in the claims of the present invention, and may have a configuration other than the invention-specific matters together with the invention-specific matters described in the claims of the present invention.

BRIEF DESCRIPTION OF THE DRAWINGS

FIG. 1 is a view for illustrating a configuration of an unlocking system according to an embodiment.

FIG. 2 is a view for illustrating a configuration of a wireless terminal.

FIG. 3 is a view for illustrating a configuration of an in-vehicle ECU.

FIG. 4 is a view for illustrating a flow of a shielded state determining process executed by a DKECU.

FIG. 5 is a view for illustrating an example of appearance frequency distribution of radio wave strength.

FIG. 6 is a view for illustrating Example 1 of a time change of the radio wave strength.

FIG. 7 is a view for illustrating Example 2 of the time change of the radio wave strength.

FIG. 8 is a view for illustrating a flow of a region determining process executed by the DKECU.

FIG. 9 is a view for illustrating a flow of an unlocking control process executed by a lock device.

DETAILED DESCRIPTION

Hereinafter, an example of an embodiment of an unlocking system and a control method of the unlocking system, a control device and a control method of the control device, and a determination device and a determination method according to the present invention will be described with reference to the drawings. A configuration, an operation, and the like of the embodiment described below are examples, and the present invention is not limited to such configurations, operations, and the like. In the following, the same or similar description will be simplified or omitted as appropriate. In each drawing, the same or similar members or parts will not be given the reference numerals or given the same reference numerals. The details of the structure and the like will be simplified or omitted as appropriate.

The unlocking system and the control method of the unlocking system according to the present embodiment will be described by taking as an example an unlocking system for releasing a lock provided to an automobile, but the present invention is not particularly limited thereto, and can be applied to systems for releasing the lock provided to motorcycles or bicycles, offices, houses, fixtures or furniture, other than automobiles.

[Regarding Unlocking System]

An unlocking system 100 according to the present embodiment will be described with reference to FIGS. 1 to 3. The unlocking system 100 of the present embodiment is a system that unlocks a lock 21 of a door of an automobile 1 based on a wireless signal transmitted via radio waves from a wireless terminal 10.

As illustrated in FIG. 1, the unlocking system 100 includes the wireless terminal 10 carried by a user U, an in-vehicle ECU 20 installed to the automobile 1, and a lock device 40 that controls the lock 21 provided to the door of the automobile 1.

The wireless terminal 10 is a small portable electronic device that can be carried by the user U (for example, a user of the automobile 1), and is a device that transmits the wireless signal via radio waves to the in-vehicle ECU 20 based on an operation by the user U. For example, the user U can carry the wireless terminal 10 in a hand Ua of the user U, or put the wireless terminal 10 in a pocket Ub on the rear side of the pants of the user U to carry the wireless terminal 10.

The wireless terminal 10 may be provided with a function of transmitting the wireless signal to the in-vehicle ECU 20 via radio waves, and may be configured with a general-purpose information processing device such as a mobile phone, a smartphone, or a tablet PC, or may be configured with a dedicated device such as a remote control key.

As illustrated in FIG. 2, the wireless terminal 10 includes: a terminal receiving unit 10a that receives a wireless signal transmitted via radio waves from the in-vehicle ECU 20; a terminal transmitting unit 10b that transmits the wireless signal via radio waves to the in-vehicle ECU 20; a terminal operation unit 10c that receives the operation by the user U, and a terminal control unit 10d that controls the wireless terminal 10.

The terminal receiving unit 10a receives the wireless signal from the in-vehicle ECU 20 via radio waves that comply with the communication standard of the short-range wireless communication technology, the terminal transmitting unit 10b transmits the wireless signal to the in-vehicle ECU 20 via radio waves that comply with the communication standard, and accordingly, the wireless terminal 10 can perform wireless communication via radio waves that comply with the communication standard with the in-vehicle ECU 20.

As a communication standard for short-range wireless communication technology, for example, BLE (Bluetooth (registered trademark) Low Energy), which is a low power communication standard by Bluetooth (registered trademark), can be applied, and by applying the BLE, the wireless terminal 10 can start communication by detecting a counterpart device. A communication module of the wireless terminal 10 may be configured complying with a wireless communication standard other than BLE as a communication standard of short-range wireless communication technology, and may comply with wireless communication standard via radio waves such as UWB (Ultra-Wideband), NFC (Near Field Communication), or WiFi (registered trademark). The communication module of the wireless terminal 10 may perform communication using a technology for communicating via radio waves other than the short-range wireless communication technology.

The terminal operation unit 10c has a function of receiving the operation by the user U or the like, and for example, has a function of a lock button that receives an operation for locking the lock 21 provided to the door of the automobile 1 and an unlock button that receives an operation for unlocking the lock 21. Then, when the operation by the user U or the like is received, the information on the operation is output to the terminal control unit 10d. The terminal operation unit 10c may be configured to receive operations by, for example, a button switch, a touch display, or the like, or may be configured to receive operations by using a technology such as speech recognition.

The terminal control unit 10d is configured with an electronic circuit or the like including a CPU (Central Processing Unit), a ROM (Read Only Memory), a RAM (Random Access Memory), and the like. By executing various programs stored in a storage device such as a ROM by a CPU or the like, a function of executing various processes described later is realized, and the wireless terminal 10 is controlled. For example, the terminal control unit 10d executes control for transmitting the wireless signal including predetermined information from the terminal transmitting unit 10b, control for receiving the wireless signal by the terminal receiving unit 10a, and the like. The terminal control unit 10d may be configured with dedicated hardware resources and dedicated software resources, and for example, may be configured with common hardware resources and common software resources included in a device or the like that executes other control in the wireless terminal 10. The terminal control unit 10d operates by receiving electric power from a battery (not illustrated) provided to the wireless terminal 10.

The terminal control unit 10d includes: a terminal acquisition unit 10e that acquires information on the wireless signal received by the terminal receiving unit 10a, information on the operation received by the terminal operation unit 10c, and the like; and a terminal execution unit 10f that executes a predetermined process or the like based on various information or the like acquired by the terminal acquisition unit 10e.

The predetermined process executed by the terminal execution unit 10f includes, for example, a locking signal transmission process of transmitting the wireless signal instructing the locking of the lock 21, an unlocking signal transmission process of transmitting the wireless signal instructing the unlocking of the lock 21, and the like. The locking signal transmission process is a process executed when an operation for locking the lock 21 is received, and in this process, the terminal execution unit 10f executes control for transmitting the wireless signal including instruction information IIa for instructing the locking of the lock 21 from the terminal transmitting unit 10b complying with the communication standard of the above-described short-range wireless communication technology. The unlocking signal transmission process is a process executed when an operation for unlocking the lock 21 is received, and in this process, the terminal execution unit 10f executes control for transmitting the wireless signal including instruction information IIb for instructing the unlocking of the lock 21 from the terminal transmitting unit 10b complying with the communication standard of the above-described short-range wireless communication technology.

In the control for transmitting each wireless signal, the terminal execution unit 10f performs control such that unique identification information ID for identifying the wireless terminal 10 which is a transmission source of the wireless signal is included in each of the wireless signals. Accordingly, the transmission source of the wireless signal can be specified on the in-vehicle ECU 20 side that has received the wireless signal transmitted by the wireless terminal 10.

As illustrated in FIG. 3, the in-vehicle ECU 20 includes: receiving antennas 20*a* to 20*e* for receiving the wireless signals transmitted via radio waves from the wireless terminal 10; a transmitting antenna 20*f* for transmitting the wireless signal via radio waves to the wireless terminal 10; a control device 30 (hereinafter, there is a case of being referred to as a Digital Key Electronic Unit (DKECU)) that performs a process related to the control of the lock 21 based on the wireless signals acquired via the receiving antennas 20*a* to 20*e*; and the lock device 40 for controlling the locking and unlocking of the lock 21. The receiving antennas 20*a* to 20*e*, the transmitting antenna 20*f*, and the lock device 40 are connected to the DKECU 30 in a controllable manner from the DKECU 30, respectively.

The receiving antennas 20*a* to 20*e* are arranged at predetermined positions of the automobile 1, and the radio wave receiving environments of each receiving antenna (for example, the receiving antenna 20*a* and the receiving antennas 20*b* to 20*e*) are different from each other. For example, the receiving antenna 20*a* is disposed on a side garnish on the left side of the automobile 1, the receiving antenna 20*b* is disposed on a center console of the automobile 1, the receiving antenna 20*c* is disposed on a side garnish on the right side of the automobile 1, the receiving antenna 20*d* is disposed on a rear garnish on the rear side of the automobile 1, and the receiving antenna 20*e* is disposed on a bumper on the rear side of the automobile 1 (refer to FIG. 1). In the present embodiment, the receiving antennas 20*a* to 20*e* are configured to be disposed in the side garnish, the rear garnish, and the center console of the automobile 1, but the receiving antennas 20*a* to 20*e* may be configured to be disposed in a positional relationship having different radio wave receiving environments, and may be configured to be disposed at a position other than the side garnish, the rear garnish, and the center console, for example, at the ceiling, the floor, the cabin, or the like of the automobile 1. The in-vehicle ECU 20 includes a plurality of antennas for receiving the wireless signal from the wireless terminal 10, and compared to a radio wave strength of the wireless signal received at one antenna among the plurality of antennas, the plurality of antennas are preferably disposed such that the radio wave strength of the wireless signal received by another antenna is greater than a predetermined reference amount.

The DKECU 30 (control device 30) is a control device that controls the unlocking and the like of the lock 21 based on the wireless signals received via the above-described receiving antennas 20*a* to 20*e*, is configured with an electronic circuit or the like including a CPU (Central Processing Unit), a ROM (Read Only Memory), and a RAM (Random Access Memory), and executes a control of the unlocking or the like of the lock 21 by realizing a predetermined process which will be described later as the CPU executes various programs stored in a storage device such as a ROM. The DKECU 30 may be configured with dedicated hardware resources and dedicated software resources, and for example, may be configured with common hardware resources and common software resources included in the control device or the like (for example, the lock device 40) that is installed to the automobile 1 and executes other controls. The hardware resources that configure the DKECU 30 may be configured with one hardware resource, or may be configured with a plurality of two or more hardware resources. The software resources that configure the DKECU 30 may be configured with one software resource, or may be configured with a plurality of two or more software resources.

The DKECU 30 receives the wireless signal via radio waves that comply with the communication standard of the above-described short-range wireless communication technology by the receiving antennas 20*a* to 20*e*, and transmits the wireless signal via radio waves that comply with the communication standard by the transmitting antenna 20*f*, and accordingly it is possible to perform the wireless communication by radio waves that comply with the communication standard with the above-described wireless terminal 10.

As illustrated in FIG. 3, the DKECU 30 includes: a DK acquisition unit 30*a* that acquires the wireless signal via the receiving antennas 20*a* to 20*e*; and a DK execution unit 30*b* that executes a predetermined process based on the wireless signal acquired by the DK acquisition unit 30*a*.

The DK acquisition unit 30*a* acquires the wireless signal via the receiving antennas 20*a* to 20*e*, and acquires the above-described instruction information IIa, IIb, and the like included in the wireless signal. Strength information RI on the strength of the radio waves of the wireless signal received at each of the receiving antennas 20*a* to 20*e* is acquired for each of the receiving antennas 20*a* to 20*e*.

The DK execution unit 30*b* executes a predetermined process or the like. In the predetermined process, for example, as will be described later, a shielded state determining process of determining a shielded state of the wireless terminal 10 based on the wireless signals received by each of the receiving antennas 20*a* to 20*e*, a region determining process of acquiring region information ZI on a region where the wireless terminal 10 is positioned based on the wireless signal and outputting the acquired region information ZI as information related to the control of the release of the lock 21, and the like.

The lock device 40 is a control device that controls the operation of the lock 21 based on information (including, for example, the instruction information IIa and IIb and the region information ZI) output by the DKECU 30, is configured with an electronic circuit or the like including a CPU (Central Processing Unit), a ROM (Read Only Memory), and a RAM (Random Access Memory), implements a predetermined process as various programs stored in the storage device such as the ROM are executed by the CPU, and executes the control for operating the lock 21 for unlocking. The lock device 40 may be configured with dedicated hardware resources and dedicated software resources, and for example, may be configured with common hardware resources and common software resources included in other control devices or the like. The hardware resources that configure the lock device 40 may be configured with one hardware resource, or may be configured with a plurality of two or more hardware resources. The software resources that configure the lock device 40 may be configured with one software resource, or may be configured with a plurality of two or more software resources.

As illustrated in FIG. 3, the lock device 40 includes: an information acquisition unit 40*a* that acquires the instruction information IIb and the region information ZI which are output from the above-described DKECU 30; and an unlocking execution unit 40*b* that executes the unlocking control process of controlling the operation of the lock 21 for unlocking, based on the instruction information IIb and the region information ZI as will be described later. The lock 21 provided to the door of the automobile 1 is connected to the lock device 40 in a controllable manner. The lock device 40 is installed to the automobile 1 and operates by receiving electric power from the battery of the automobile 1.

As described above, the unlocking system 100 of the present embodiment has a configuration including the wireless terminal 10, the in-vehicle ECU 20, the lock device 40, and the lock 21. When the operation for unlocking the lock 21 by the user U is received by the terminal operation unit 10c, the wireless terminal 10 transmits the wireless signal including the instruction information IIb instructing the unlocking of the lock 21 to the in-vehicle ECU 20. On the other hand, the DKECU 30 of the in-vehicle ECU 20 acquires the instruction information IIb and the region information ZI based on the wireless signal received from the wireless terminal 10 and outputs the acquired instruction information IIb and the region information ZI to the lock device 40. Then, the lock device 40 controls the operation of the lock 21 for unlocking based on the instruction information IIb and the region information ZI.

In the present embodiment, the lock 21 of which the operation for unlocking is controlled by the DKECU 30 and the lock device 40 is provided to the door of the automobile 1, but the lock 21 may be provided to the door of the automobile 1, for example, may be provided to a trunk room of the automobile 1 or may be provided to a fuel filler port of the automobile 1, or may be a combination of these configurations.

In the present embodiment, the in-vehicle ECU 20 includes the DKECU 30 and the lock device 40, and the lock device 40 is configured to acquire the instruction information IIb and the region information ZI which are acquired by the DKECU 30 from the DKECU 30. However, for example, the lock device 40 may be configured to acquire the instruction information IIb from the wireless signals received by the receiving antennas 20a to 20e without going through the DKECU 30.

In the present embodiment, the in-vehicle ECU 20 includes the DKECU 30 and the lock device 40, and the lock device 40 is configured to control the operation of the lock 21 for unlocking based on the instruction information IIb and the region information ZI which are acquired by the DKECU 30. However, for example, the lock 21 may be connected to the DKECU 30 in a controllable manner, and the DKECU 30 may be configured to control the operation of the lock 21 for unlocking without going through the lock device 40.

[Regarding Control Method of Unlocking System]

As an example of the control method of the unlocking system 100 according to the present embodiment, a shielded state determining process Sa and a region determining process Sb which are executed by the DKECU 30, and an unlocking control process Sc executed by the lock device 40 will be described with reference to FIGS. 4 to 6. A release process of the present invention corresponds to the shielded state determining process Sa, the region determining process Sb, and the unlocking control process Sc.

As illustrated in FIG. 4, in the shielded state determining process Sa, first, the DKECU 30 executes an information acquisition process of acquiring the strength information RI on the strength of radio waves of the wireless signals at each of the receiving antennas 20a to 20e (Sa01). In the information acquisition process, the DK acquisition unit 30a repeatedly performs control for acquiring the strength of radio waves of the wireless signals received at each of the receiving antennas 20a to 20e for a predetermined period (for example, two seconds) and sequentially storing the acquired strength as the strength information RI in a predetermined region of a storage unit (not illustrated) of the DKECU 30, at predetermined time intervals (for example, every 0.01 seconds). Accordingly, the transition of the strength information RI for each of the receiving antennas 20a to 20e is acquired in the storage unit of the DKECU 30.

After the strength information RI is acquired in the information acquisition process of the step of Sa1, the DKECU 30 executes an analysis process 1 of analyzing the strength information RI acquired in the information acquisition process (Sa02). In the analysis process 1, the DK execution unit 30b analyzes the distribution of the appearance frequency of the strength information RI at the corresponding receiving antennas 20a to 20e and the difference amount of the strength information RI at the two corresponding receiving antennas 20a to 20e, and determines the shielded state of the wireless terminal 10 based on the result of the analysis.

Specifically, the DK execution unit 30b first refers to the transition of the strength information RI for each of the receiving antennas 20a to 20e stored in the storage unit of the DKECU 30, and specifies a receiving antenna having the highest average value of the strength information RI in a predetermined period (for example, two seconds) as a first specific antenna. Then, information on the distribution of an appearance frequency RO of the strength information RI for the first specific antenna is generated. Then, the distribution of the appearance frequency is analyzed to determine whether or not the shape of the distribution is the reference shape, and the result of the determination is stored in a predetermined region of the storage unit of the DKECU 30. For example, in a case where the wireless terminal 10 is positioned outside the vehicle on the left side of the automobile 1, the receiving antenna 20a disposed on the side garnish on the left side of the automobile 1 is specified as the first specific antenna, and it is determined whether or not the shape of the distribution of the appearance frequency of the strength information RI at the receiving antenna 20a is the reference shape.

Here, in the relationship between the radio wave strength of the wireless signal received at each of the receiving antennas 20a to 20e and the appearance frequency RO of each radio wave strength, the shape of the appearance frequency distribution illustrated by a graph drawn with the radio wave strength as the horizontal axis and the appearance frequency RO as the vertical axis has a predetermined tendency depending on the shielded state of radio waves in the wireless terminal 10, as will be described later.

FIG. 5 illustrates an example of a shape ROa of the appearance frequency distribution of the strength information RI at the receiving antenna 20a in a state where the wireless terminal 10 is positioned outside the vehicle on the left side of the automobile 1 and the wireless terminal 10 is carried in a hand Uh of the user U (refer to FIG. 1), that is, a state (hereinafter, there is a case of being called a first shielded state) where the wireless terminal 10 is positioned between the body of the user U and the receiving antennas 20a to 20e and a shielding body (for example, the body of the user U who is the owner of the wireless terminal 10) that shields radio waves does not exist between the wireless terminal 10 and the receiving antennas 20a to 20e. FIG. 5 illustrates an example of a shape ROb of the appearance frequency distribution of the strength information RI at the receiving antenna 20a in a state where the wireless terminal 10 is positioned outside the vehicle on the right side of the automobile 1 and the wireless terminal 10 is put in a rear pocket of the pants of the user U and carried (refer to FIG. 1), that is, a state (hereinafter, there is a case of being called a second shielded state) where the body of the user U is positioned between the wireless terminal 10 and the receiving antennas 20a to 20e and the shielding body (for example, the body of the user U who is the owner of the wireless terminal 10) that shields radio waves exists between the wireless terminal 10 and the receiving antennas 20a to 20e.

As illustrated in FIG. 5, in the first shielded state, as the radio waves of the wireless signal emitted from the wireless terminal 10 pass through one generally linear path from the wireless terminal 10 to the receiving antennas 20a to 20e, and reach the receiving antennas 20a to 20a, there is a tendency that the shape ROa of the appearance frequency distribution of the strength information RI at the receiving antenna 20a becomes a shape (for example, when the strength information RI is extracted in descending order of appearance frequency, the difference in strength between the highest strength information RI and the second highest strength information RI is less than a predetermined amount) having approximately one peak. Meanwhile, in the second shielded state, as the radio waves of the wireless signal emitted from the wireless terminal 10 pass through a plurality of paths (for example, two) such as a path that detours the shielding body or a path that penetrates the shielding body and reach the receiving antennas 20a to 20e due to a diffraction phenomenon or a transmission phenomenon of radio waves, there is a tendency that the shape ROb of the appearance frequency distribution of the strength information RI at the receiving antenna 20a becomes a shape (for example, when the strength information RI is extracted in descending order of appearance frequency, the difference in strength between the highest strength information RI and the second highest strength information RI is equal to or greater than a predetermined amount) having a plurality of peaks (for example, two). Although a specific example is omitted, there is a tendency that the shape of the appearance frequency distribution of the strength information RI at the receiving antennas 20b to 20e other than the receiving antenna 20a is similar to the above-described shape of the appearance frequency distribution of the strength information RI at the receiving antenna 20a depending on the shielded state of radio waves in the wireless terminal 10.

In the storage unit of the DKECU 30, information on a reference shape (for example, a shape having two peaks) set based on the shape of the appearance frequency distribution at each of the receiving antennas 20a to 20e measured and acquired in the second shielded state in an experiment or the like performed in advance, is registered in advance. In the analysis process 1, the DK execution unit 30b compares the shape of the appearance frequency distribution of the strength information RI for the first specific antenna obtained by the analysis with the reference shape. In a case where the degree of coincidence between the shape of the appearance frequency distribution and the reference shape is equal to or greater than a predetermined reference amount, it is determined that the shape of the appearance frequency distribution is the reference shape, and in a case where the degree of coincidence is below the reference amount, it is determined that the shape of the appearance frequency distribution is not the reference shape.

In the analysis process 1, the DK execution unit 30b refers to the transition of the strength information RI for each of the receiving antennas 20a to 20e stored in the storage unit of the DKECU 30, and specifies a receiving antenna of which the average value of the strength information RI in a predetermined period (for example, two seconds) is the second highest after that of the first specific antenna, as the second specific antenna. Then, the difference information on the transition of the difference amount obtained by subtracting the transition of the strength information RI at the first specific antenna from the transition of the strength information RI at the second specific antenna is generated. Then, it is determined whether or not the difference amount exceeds a predetermined second reference amount $\alpha 2$, and the result of the determination is stored in a predetermined region of the storage unit of the DKECU 30. For example, in a case where the wireless terminal 10 is positioned outside the vehicle on the left side of the automobile 1, the receiving antenna 20a disposed on the side garnish on the left side of the automobile 1 is specified as the first specific antenna, the receiving antenna 20e disposed on the bumper on the rear side of the automobile 1 is specified as the second specific antenna, and it is determined whether or not the difference amount between the strength information RI of the first specific antenna and the strength information RI of the second specific antenna exceeds the second reference amount $\alpha 2$.

Here, the difference amount between the strength information RI at each of the receiving antennas 20a to 20e and the strength information RI of the first specific antenna has a predetermined tendency depending on the shielded state of radio waves of the wireless terminal 10, as will be described later.

In FIG. 6, regarding the difference information generated by using the receiving antenna 20a as the first specific antenna and the receiving antenna 20e as the second specific antenna, an example of the difference information RIa (20e) when the wireless terminal 10 is in the above-described first shielded state and an example of the difference information RIb (20e) in the above-described second shielded state are illustrated.

As illustrated in FIG. 6, in the second shielded state, as the number of shielding bodies (for example, the body of the user U) between the wireless terminal 10 and the receiving antennas 20a to 20e increases compared to the first shielded state, there is a tendency that the difference information RIb (20e) in the second shielded state is smaller than the difference information RIa (20e) in the first shielded state. Although a specific example is omitted, there is a tendency that the difference information at the receiving antennas 20b to 20d other than the receiving antenna 20e is also smaller in the second shielded state than that in the first shielded state.

In the storage unit of the DKECU 30, information on the second reference amount $\alpha 2$ set based on the difference information RIa for each of the receiving antennas in the first shielded state and the difference information RIb for each of the receiving antennas in the second shielded state, which are measured in advance in an experiment or the like, is registered in advance. The second reference amount $\alpha 2$ is set to be an intermediate value between the difference information Ria and the difference information RIb, which is a value smaller than the difference information Ria for each receiving antenna measured in the first shielded state, and is larger than the difference information RIb for each of the receiving antennas measured in the second shielded state.

Then, in a case where it is determined that the shape of the appearance frequency distribution of the strength information is not the reference shape, the DK execution unit 30b determines that the shielded state of the wireless terminal 10 is the first shielded state. In a case where it is determined that the shape of the appearance frequency distribution of the strength information is the reference shape and the difference information does not exceed the second reference amount $\alpha 2$, it is determined that the shielded state of the wireless terminal 10 is the first shielded state. Meanwhile, in a case where it is determined in the analysis process 1 that the shape of the appearance frequency distribution of the strength information is the reference shape and the difference information exceeds the second reference amount α2, it is determined that the shielded state of the wireless terminal 10 is the second shielded state.

After the analysis process 1 is executed in the step of Sa2 and the shielded state of the wireless terminal 10 is determined, the DKECU 30 executes a state setting process of setting shielding information SI indicating the current shielded state of the wireless terminal 10 based on each determination result in the analysis process 1 (Sa03).

In the state setting process, while the DK execution unit 30b sets the shielding information SI indicating that the current shielded state of the wireless terminal 10 is the first shielded state to be in a predetermined region of the storage unit of the DKECU 30 in a case where it is determined that the wireless terminal 10 is in the first shielded state in the analysis process 1, the DK execution unit 30b sets the shielding information SI indicating that the current shielded state of the wireless terminal 10 is the second shielded state to be in a predetermined region of the storage unit of the DKECU 30 in a case where it is determined that the wireless terminal 10 is in the second shielded state. The shielding information SI set in the predetermined region of the storage unit can be referred to in the region determining process Sb.

After the state setting process is executed and the shielding information SI is set in the step of Sa3, the DKECU 30 executes a strength information acquisition process of acquiring the strength information RI at each of the receiving antennas 20a to 20e by the DK acquisition unit 30a (Sa04).

After the strength information acquisition process is executed in the step of Sa4 and the strength information RI is acquired, the DKECU 30 executes an analysis process 2 of analyzing the strength information RI (Sa05). In the analysis process 2, the difference amount of the strength information RI at the two corresponding receiving antennas and the time change amount of the strength information RI at the corresponding receiving antenna are analyzed, and the shielded state of the wireless terminal 10 is determined based on the result of the analysis.

Specifically, similar to the above-described analysis process 1, the DK execution unit 30b first refers to the transition of the strength information RI for each of the receiving antennas 20a to 20e stored in the storage unit of the DKECU 30, specifies the first specific antenna and the second specific antenna, and generates the difference information. Then, it is determined whether or not the difference amount exceeds the second reference amount α2 based on the difference information, and the result of the determination is stored in a predetermined region of the storage unit of the DKECU 30.

In the analysis process 2, the DK execution unit 30b refers to the transition of the strength information RI for each of the receiving antennas 20a to 20e stored in the storage unit of the DKECU 30, and the time change amount of the strength information RI at the first specific antenna is acquired. Then, it is determined whether or not the time change amount exceeds the predetermined first reference amount α1, and the result of the determination is stored in a predetermined region of the storage unit of the DKECU 30. For example, in a case where the wireless terminal 10 is positioned outside the vehicle on the left side of the automobile 1, the receiving antenna 20a disposed on the side garnish on the left side of the automobile 1 is specified as the first specific antenna, and it is determined whether or not the time change amount of the strength information RI at the receiving antenna 20a exceeds the first reference amount α1.

Here, the time change amount of the strength information RI at each of the receiving antennas 20a to 20e has a predetermined tendency depending on the shielded state of radio waves in the wireless terminal 10.

FIG. 7 illustrates the transition of the strength information RI at the receiving antenna 20a in a case where the state where the wireless terminal 10 is carried by the user U changes from a state of being carried by the hand Uh of the user U, that is, the first shielded state (RIa), to a state of being carried in a pocket Up on the rear side of the pants of the user U, that is, the second shielded state (RIb), when the wireless terminal 10 is carried by the user U outside the vehicle on the left side of the automobile 1.

As illustrated in FIG. 7, in the transition of the strength information RI at the receiving antenna 20a, when the shielded state of the wireless terminal 10 changes from the first shielded state to the second shielded state, there is a tendency that the strength information RI exceeds the predetermined first reference amount α1 and deteriorates. Although a specific example is omitted, there is a tendency that the transition of the strength information RI at the receiving antennas 20b to 20e other than the receiving antenna 20a is similar to the above-described change in strength information RI at the receiving antenna 20a depending on the change of the shielded state of the wireless terminal 10 from the first shielded state to the second shielded state.

In the storage unit of the DKECU 30, the strength information RI at each of the receiving antennas 20a to 20e in the first shielded state measured by an experiment or the like performed in advance, and information on the first reference amount α1 set based on the strength information RI at each of the receiving antennas 20a to 20e in the second shielded state, are registered in advance. The first reference amount α1 is set for each of the receiving antennas 20a to 20e, and for example, the difference amount between the strength information RIa measured when the wireless terminal 10 is in the first shielded state and the strength information RIb measured in the second shielded state is set as the time change amount of the strength information RI at the corresponding receiving antenna.

Then, in a case where it is determined that the wireless terminal 10 is in the second shielded state based on the difference amount of the strength information RI, and it is determined that the wireless terminal 10 is in the second shielded state based on the time change amount of the strength information RI, the DK execution unit 30b determines that the shielded state of the wireless terminal 10 is the second shielded state. Meanwhile, in a case where it is determined that the wireless terminal 10 is not in the second shielded state in at least one of the difference amount and the time change amount of the strength information RI, the DK execution unit 30b determines that the shielded state of the wireless terminal 10 is the first shielded state.

After the analysis process 2 is executed in the step of Sa5 and the shielded state of the wireless terminal 10 is determined, the DKECU 30 acquires the shielding information SI set in the storage unit of the DKECU 30. Then, it is determined whether or not the current shielded state of the wireless terminal 10 specified based on the shielding information SI matches the shielded state of the wireless terminal 10 determined in the analysis process 2 in the step of Sa05 (Sa06), and in a case where it is determined that the states do not match each other, that is, the determination result is (N), a state update process of updating the shielding information SI in the storage unit of the DKECU 30 is executed (Sa07). In the state update process, the DK execution unit 30b updates the shielding information SI set in the predetermined region of the storage unit of the DKECU 30 to the shielded state determined by the analysis process 2.

Meanwhile, in a case where it is determined in the step of Sa06 that the shielded state of the wireless terminal 10 specified based on the shielding information SI matches the shielded state determined in the analysis process 2 in the step of Sa05, that is, the determination result is (Y), the analysis process 1 executed in the steps of Sa02 is executed again (Sa08). Then, it is determined whether or not the current shielded state of the wireless terminal 10 specified based on the shielding information SI matches the shielded state of the wireless terminal 10 determined in the analysis process 1 in the step of Sa08 (Sa09), and in a case where it is determined that the states match each other, that is, the determination result is (Y), the shielding information SI set in the storage unit of the DKECU 30 is maintained without update, and the process returns to the above-described step of Sa04. In a case where it is determined in the step of Sa09 that the shielded state of the wireless terminal 10 specified based on the shielding information SI does not match the shielded state determined in the analysis process 1 in the step of Sa08, that is, the determination result is (N), the step of Sa07 is executed, the shielding information SI set in the storage unit of the DKECU 30 is updated to the shielded state determined in the analysis process 1 in the step of Sa08, and the process returns to the above-described step of Sa04.

After returning from the step of Sa07 or the step of Sa09 to the step of Sa04, the DK execution unit 30b repeatedly executes the steps of Sa04 to Sa09 to perform the control of updating the shielding information SI set in the storage unit of the DKECU 30 at any time.

In this manner, the DKECU 30 in the unlocking system 100 of the present embodiment functions as a determination device that determines the shielded state of the wireless terminal 10 based on the wireless information from the wireless terminal 10 received via the receiving antennas 20a to 20e by executing the shielded state determining process Sa. As the determination device that determines the shielded state of the wireless terminal 10, the DKECU 30 determines whether the shielded state is the first shielded state where the wireless terminal 10 is not shielded by the shielding body (for example, the body of the user U who carries the wireless terminal 10) or the second shielded state where the wireless terminal 10 is shielded by the shielding body.

In the shielded state determining process of the present embodiment, the DK execution unit 30b is configured to specify the first specific antenna and the second specific antenna based on the strength information RI of each of the receiving antennas 20a to 20e, and determine the shielded state of the wireless terminal 10 based on the strength information RI at the first specific antenna and the strength information RI of the second specific antenna, but for example, the DK execution unit 30b may be configured to determine the shielded state of the wireless terminal 10 based on not only the strength information RI at the first specific antenna and the second specific antenna but also the strength information RI at all of the receiving antennas 20a to 20e.

Next, the region determining process Sb executed by the DKECU 30 will be described with reference to FIG. 8.

As illustrated in FIG. 8, in the region determining process Sb, the DKECU 30 first executes the information acquisition process of acquiring the strength information RI and the shielding information SI (Sb01). In the information acquisition process, the DK acquisition unit 30a acquires the strength information RI of the wireless signal received by each of the receiving antennas 20a to 20e. The DK acquisition unit 30a refers to a predetermined region of the storage unit of the DKECU 30 to acquire the shielding information SI.

After the strength information RI and the shielding information SI are acquired in the information acquisition process in the step of Sb01, the DKECU 30 determines whether the shielded state of the wireless terminal 10 is the first shielded state or the second shielded state based on the shielding information SI (Sb02).

In the step of Sb02, in a case where it is determined that the wireless terminal 10 is in the second shielded state, that is, the determination result is (Y), the DKECU 30 executes a correction process (Sb03) of correcting the strength information RI, and then executes a region setting process (Sb04) of determining the region where the wireless terminal 10 is positioned. Meanwhile, in the step of Sb02, in a case where it is determined that the wireless terminal 10 is in the first shielded state, that is, the determination result is (N), the region setting process (Sb04) is executed without executing the correction process (Sb03).

In the correction process, the DK execution unit 30b acquires the correction data set in the predetermined region of the storage unit of the DKECU 30. Then, the strength information RI acquired by the DK acquisition unit 30a in the step of Sb01 is corrected by using the correction data. The correction data is created based on experiments and simulations performed in advance, and for example, the ratio of the strength information RI measured in the first shielded state to the strength information RI measured in the second shielded state is mapped for each of the receiving antennas 20a to 20e and registered in the storage unit of the DKECU 30 as the correction data.

In the region setting process, the DK execution unit 30b refers to region determination data set in the predetermined region of the storage unit of the DKECU 30 and determines the region where the wireless terminal 10 is positioned based on the region determination data and the strength information RI.

While the strength information RI used in the region setting process is the strength information RI acquired in the step of Sb01 in a case where the above-described step of Sb03 is executed, that is, in a case where it is determined in the step of Sb02 that the wireless terminal 10 is in the first shielded state, the strength information RI acquired in the step of Sb01 is the strength information RI corrected by using the correction data in a case where the step of Sb03 is not executed, that is, in a case where it is determined in the step of Sb02 that the wireless terminal 10 is in the second shielded state.

The region determination data is created based on experiments and simulations performed in advance, and for example, the relationship between the strength information RI measured in the first shielded state and the region where the wireless terminal 10 is positioned for each of the receiving antennas 20a to 20e is mapped and registered in the storage unit of the DKECU 30 as the region determination data. The region where the wireless terminal 10 is positioned can be specified based on the region determination data and the strength information RI.

Then, in the region setting process, the DKECU 30 determines the region where the wireless terminal 10 is positioned, and then sets the region information ZI indicating the determined region in a predetermined region of the storage unit of the DKECU 30.

After this, the DKECU 30 executes an information output process of outputting the instruction information II and the region information ZI (Sb05). In the information output process, the DK execution unit 30b refers to the predetermined region of the storage unit of the DKECU 30 to acquire the instruction information II and the region information ZI, and controls the output of these information to the lock device 40.

After outputting the instruction information II and the region information ZI in the information output process in the step of Sb05, the DKECU 30 ends the region determining process Sb.

In this manner, in the region determining process Sb executed by the DKECU 30 in the unlocking system 100 of the present embodiment, the DK execution unit 30b uses the shielding information SI acquired by the above-described shielded state determining process to determine whether or not the wireless terminal 10 is in the second shielded state of being shielded by the shielding body, and in a case where it is determined that the wireless terminal 10 is in the second shielded state, the strength information RI is corrected by using the correction data, and the DK execution unit 30b corrects the strength information RI by using the shielding information SI.

In the region determining process Sb, in a case where it is determined that the wireless terminal 10 is in the second shielded state, the DK execution unit 30b corrects the strength information RI by using the correction data, and acquires the region information ZI on the region where the wireless terminal 10 is positioned based on the corrected strength information RI, and the DK execution unit 30b acquires the region information ZI based on the strength information RI corrected by using the shielding information SI. Then, the region information ZI is output to the lock device 40 and is referred to when the control for releasing the lock 21 is executed by the lock device 40.

In the region determining process Sb, the DK execution unit 30b is configured to execute the information output process and output the instruction information IIa and IIb and the region information ZI to the lock device 40, and for example, in a case where the operation for releasing the lock 21 is received by the wireless terminal 10 based on the wireless signal received by each of the receiving antennas 20a to 20e, the lock device 40 is instructed to release the lock 21 by transmitting the instruction information IIb to the lock device 40.

Next, the unlocking control process Sc executed by the lock device 40 will be described with reference to FIG. 9.

As illustrated in FIG. 9, in the unlocking control process Sc, first, the lock device 40 executes the information acquisition process of acquiring the instruction information IIb instructing the locking and unlocking of the lock 21 (Sc01). In the information acquisition process, the information acquisition unit 40a acquires the information output by the region determining process Sb executed by the above-described DKECU 30, and further acquires the region information ZI in a case where the instruction information IIb instructing the unlocking of the lock 21 is included in the information. The information acquisition unit 40a may be configured to refer to the predetermined region of the storage unit of the DKECU 30 to acquire the instruction information IIb and the region information ZI from the storage unit in a case where the instruction information IIb is stored.

After this, the unlocking execution unit 40b determines whether or not the instruction information IIb has been acquired by the information acquisition unit 40a (Sc02), and in a case where it is determined that the instruction information IIb has been acquired, that is, the determination result is (Y), based on permitted region information ZIa preset in the predetermined region of the storage unit of the lock device 40 and the region information ZI acquired by the information acquisition unit 40a, it is determined whether or not the region where the wireless terminal 10 is positioned is within a permitted region where the unlocking of the lock 21 is permitted (Sc03). The permitted region information ZIa is information indicating a permitted region where the unlocking execution unit 40b is permitted to unlock the lock 21 in a case where the wireless terminal 10 is positioned within the corresponding region, and for example, the region within a predetermined distance (for example, 2 m) from the DKECU 30 is preset as a permitted region.

In a case where it is determined in the step of Sc03 that the region where the wireless terminal 10 is positioned is within the permitted region, that is, the determination result is (Y), the unlocking control process of controlling the operation of the lock 21 for unlocking is executed (Sc04). In the unlocking control process, the unlocking execution unit 40b outputs a control signal instructing the unlocking of the lock 21 to the lock 21 to operate the lock 21 so as to unlock the lock 21.

Meanwhile, in a case where it is determined in the step of Sc3 that the region where the wireless terminal 10 is positioned is not within the permitted region, that is, the determination result is (N), an error process of executing a process related to the error is executed (Sc05). In the error process, the unlocking execution unit 40b executes, as the process related to the error, for example, a process of setting the acquisition of the instruction information IIb in a state where the wireless terminal 10 is not within the permitted region in a storage region of the lock device 40 as an error log. In the error process, the unlocking execution unit 40b determines, for example, whether or not an abnormality has occurred based on the error log, and in a case where it is determined that an abnormality has occurred, a predetermined device (for example, the wireless terminal 10 or the in-vehicle ECU 20) inside and outside the automobile 1 may be notified.

Then, in a case where it is not determined in the step of Sc02 that the instruction information IIb has been acquired, or after the unlocking control process in the step of Sc04 or the error process in the step of Sc05 is executed, the lock device 40 terminates the unlocking control process Sc.

In this manner, in the unlocking control process Sc executed by the lock device 40 in the unlocking system 100 of the present embodiment, based on the instruction information IIb and the region information ZI which are acquired from the DKECU 30, the unlocking execution unit 40b outputs the control signal instructing the unlocking of the lock 21 to the lock 21 and operates the lock 21 to be unlocked in a case where the operation for releasing the lock 21 is received by the wireless terminal 10 and in a case where the wireless terminal 10 is within the permitted region.

[Regarding Effects]

The unlocking system 100 of the present embodiment includes: the wireless terminal 10 that transmits the wireless signal via radio waves in response to the operation by the user U; and the in-vehicle ECU 20 that controls the unlocking of the lock 21 based on the wireless signal received via the receiving antennas 20a to 20e. In a system having such a configuration, for example, in a case where the shielding body (for example, the body of the user who carries a portable device) that shields radio waves exists between the wireless terminal 10 and the receiving antennas 20a to 20e of the in-vehicle ECU 30, even when the operation for the unlocking is performed by the user U, a situation occurs in which the lock 21 is not released, and there is a concern that the convenience of the user U deteriorates.

On the other hand, there is provided the unlocking system 100 according to the present embodiment that receives the wireless signal transferred via radio waves from the wireless terminal 10 by the receiving antennas 20a to 20e and controls release of the lock 21 provided to the automobile 1 based on the wireless signal, the system including: the DK acquisition unit 30a of the DKECU 30 that acquires the strength information RI on strength of radio waves of the wireless signal received by the receiving antennas 20a to 20e; and the DK execution unit 30b of the DKECU 30 and the unlocking execution unit 40b of the lock device 40 that execute the shielded state determining process Sa, the region determining process Sb, and the unlocking control process Sc as an unlocking process of controlling release of the lock 21, the DK execution unit 30b acquires the shielding information SI on a shielded state of the wireless terminal 10 based on the strength information RI in the shielded state determining process Sa, and corrects the strength information RI by using the shielding information SI in the region determining process Sb, and the unlocking execution unit 40b executes control for releasing the lock 21 based on the region information ZI acquired based on the corrected strength information RI in the unlocking control process Sc. According to such a configuration, in the unlocking system 100, the DK execution unit 30b and the unlocking execution unit 40b execute the control for releasing the lock 21 based on the strength information RI corrected by using the shielding information SI, and accordingly, it is possible to improve the accuracy of unlocking according to the shielded state of the wireless terminal 10, and to improve the convenience of the user.

In the shielded state determining process Sa of the present embodiment, the DK execution unit 30b analyzes the appearance frequency distribution of the strength information RI and acquires the shielding information SI based on the shape of the appearance frequency distribution. According to such a configuration, in the unlocking system 100, the shielding information SI can be acquired based on the shape of the appearance frequency distribution of the strength information RI.

In the shielded state determining process Sa of the present embodiment, the DK execution unit 30b analyzes the time change of the strength information RI at the receiving antennas 20a to 20e, and acquires the shielding information SI based on the time change amount of the strength information RI. According to such a configuration, in the unlocking system 100, the shielding information SI can be acquired based on the time change amount of the strength information RI.

The unlocking system 100 of the present embodiment includes the receiving antennas 20a to 20e for receiving wireless signals from the wireless terminal 10, and the receiving antennas 20a to 20e have the receiving antenna 20a as a first antenna and the receiving antennas 20b to 20e as the second antennas having different radio wave receiving environments from that of the first antenna, and in the shielded state determining process Sa, the DK execution unit 30b acquires the shielding information SI based on the difference between the strength information RI at the first receiving antenna 20a and the strength information RI at the second receiving antennas 20b to 20e. According to such a configuration, in the unlocking system 100, it is possible to acquire the shielding information SI based on the difference between the strength information RI at the first receiving antenna 20a and the strength information RI at the second receiving antennas 20b to 20e.

In the shielded state determining process Sa of the present embodiment, the DK execution unit 30b analyzes the appearance frequency distribution of the strength of radio waves based on the strength information RI, and in a case where the shape of the appearance frequency distribution is the reference shape, the DK execution unit 30b acquires the shielding information SI corresponding to the shielded state where the wireless terminal 10 is shielded by the shielding body, that is, the shielding information SI indicating that the current shielded state of the wireless terminal 10 is the second shielded state, and in the region determining process Sb, the DK execution unit 30b specifies the shielded state of the wireless terminal 10 by using the shielding information SI, and corrects the strength information RI by the correction data corresponding to the specified shielded state. According to such a configuration, in the unlocking system 100, it is possible to determine the shielded state of the wireless terminal 10 based on the strength information RI, correct the strength information RI by the correction data corresponding to the determined shielded state, and control the unlocking of the lock 21 based on the corrected strength information RI, and thus, it is possible to improve the accuracy of the unlocking.

In the shielded state determining process Sa of the present embodiment, the DK execution unit 30b analyzes the appearance frequency distribution of the strength of radio waves based on the strength information RI, and in a case where the shape of the appearance frequency distribution is not the reference shape and it is specified based on the strength information RI that the strength of radio waves at the receiving antennas 20a to 20e exceeds the first reference amount α1 and deteriorates, the DK execution unit 30b determines that the wireless terminal 10 is in the second shielded state of being shielded by the shielding body, and in the region determining process Sb, the DK execution unit 30b specifies the shielded state of the wireless terminal 10 by using the shielding information SI, and corrects the strength information RI by the correction data corresponding to the specified shielded state. According to such a configuration, in the unlocking system 100, it is possible to determine the shielded state of the wireless terminal 10 based on the strength information RI, correct the strength information RI by the correction data corresponding to the determined shielded state, and control the unlocking of the lock 21 based on the corrected strength information RI, and thus, it is possible to improve the accuracy of the unlocking.

The unlocking system 100 according to the present embodiment includes the receiving antennas 20a to 20e that receive the wireless signal from the wireless terminal 10, the receiving antennas 20a to 20e include the receiving antenna 20a as the first antenna and the receiving antennas 20b to 20e as the second antenna having radio wave receiving environments different from that of the first antenna, and in the shielded state determining process Sa, the DK execution unit 30b analyzes the appearance frequency distribution of radio wave strength based on the strength information RI, and in a case where the shape of the appearance frequency distribution is the reference shape and it is specified based on the strength information RI that a difference amount between the radio wave strength at the first receiving antenna 20a and the radio wave strength at the second receiving antennas 20b to 20e is below the second reference amount α2, the DK execution unit 30b corrects the strength information RI by using the shielding information SI corresponding to the shielded state where the wireless terminal 10 is shielded by the shielding body. According to such a configuration, in the unlocking system 100, it is possible to determine the shielded state of the wireless terminal 10 based on the strength information RI, correct the strength information RI by the correction data corresponding to the determined shielded state, and control the unlocking of the lock 21 based on the corrected strength information RI, and thus, it is possible to improve the accuracy of the unlocking.

In the unlocking system 100 of the present embodiment, in the shielded state determining process Sa, the DK execution unit 30b determines the first shielded state where the wireless terminal 10 is not shielded by the shielding body and the second shielded state where the wireless terminal 10 is shielded by the shielding body, the shielding body is the owner U (user U) of the wireless terminal 10, and the shielding information SI corresponding to the shielded state where the wireless terminal 10 is shielded by the shielding body is information corresponding to the shielded state where the wireless terminal 10 is shielded by the owner U of the wireless terminal 10. According to such a configuration, in the unlocking system 100, it is possible to determine the first shielded state where the wireless terminal 10 is not shielded by the body of the user U, and the second shielded state where the wireless terminal 10 is shielded by the body of the user U.

In the region determining process Sb of the present embodiment, the DK execution unit 30b acquires the region information ZI on the region where the wireless terminal 10 is positioned based on strength information RIc corrected by using the shielding information SI, and in the unlocking control process Sc, the unlocking execution unit 40b executes the control for releasing the lock 21 based on the region information ZI.

There is provided the control method of the unlocking system 100 according to the present embodiment for receiving the wireless signal transferred via radio waves from the wireless terminal 10 by the receiving antennas 20a to 20e and controlling release of the lock 21 provided to the automobile 1 based on the wireless signal, the method including: a step of acquiring the strength information RI on strength of radio waves of the wireless signal received by the receiving antennas 20a to 20e, by the DK acquisition unit 30a of the DKECU 30; a step of executing the shielded state determining process Sa and the region determining process Sb as an unlocking process of controlling release of the lock 21, by the DK execution unit 30b of the DKECU 30; and a step of executing the unlocking control process Sc as the unlocking process, by the unlocking execution unit 40b of the lock device 40, the DK execution unit 30b acquires the shielding information SI on a shielded state of the wireless terminal 10 based on the strength information RI in the shielded state determining process Sa, and corrects the strength information RI by using the shielding information SI in the region determining process Sb, and the unlocking execution unit 40b executes control for releasing the lock 21 based on the region information ZI acquired based on the corrected strength information RI in the unlocking control process Sc. According to such a configuration, in the control method of the unlocking system 100, the DK execution unit 30b and the unlocking execution unit 40b execute the control for releasing the lock 21 based on the strength information RI corrected by using the shielding information SI, and accordingly, it is possible to improve the accuracy of unlocking according to the shielded state of the wireless terminal 10, and to improve the convenience of the user.

There is provided the DKECU 30 according to the present embodiment is a control device that controls release of the lock 21 based on the wireless signal transmitted from the wireless terminal 10, transferred via radio waves, and received by the receiving antennas 20a to 20e, the device including: the DK acquisition unit 30a that acquires the strength information RI on strength of radio waves of the wireless signal received by the receiving antennas 20a to 20e; and the DK execution unit 30b that executes the shielded state determining process Sa and the region determining process Sb as an unlocking process of controlling the release of the lock 21, in which the DK execution unit 30b acquires the shielding information SI on a shielded state of the wireless terminal 10 based on the strength information RI in the shielded state determining process Sa, corrects the strength information RI by using the shielding information SI in the region determining process Sb, acquires the region information ZI based on the corrected strength information RI, and executes control for outputting the region information ZI and the instruction information IIb included in the wireless signal as information related to the control of the release of the lock 21. According to such a configuration, the DKECU 30 corrects the strength information RI by using the shielding information SI, acquires the region information ZI based on the corrected strength information RI, and outputs the region information ZI and the instruction information IIb included in the wireless signal as the information related to the control of the release of the lock 21, and accordingly, the DKECU 30 can control the release of the lock 21 in the lock device 40.

There is provided the control method of the DKECU 30 according to the present embodiment that is the control method of the control device that controls release of the lock 21 based on the wireless signal transmitted from the wireless terminal 10, transferred via radio waves, and received by the receiving antennas 20a to 20e, the method including: a step of acquiring the strength information RI on strength of radio waves of the wireless signal received by the receiving antennas 20a to 20e, by the DK acquisition unit 30a; and a step of executing the shielded state determining process Sa and the region determining process Sb as an unlocking process of controlling the release of the lock 21, by the DK execution unit 30b, in which the DK execution unit 30b acquires the shielding information SI on a shielded state of the wireless terminal 10 based on the strength information RI in the shielded state determining process Sa, corrects the strength information RI by using the shielding information SI in the region determining process Sb, acquires the region information ZI based on the corrected strength information RI, and executes control for outputting the region information ZI and the instruction information IIb included in the wireless signal as information related to the control of the release of the lock 21. According to such a configuration, in the control method of the DKECU 30, by correcting the strength information RI by using the shielding information SI, acquiring the region information ZI based on the corrected strength information RI, and outputting the region information ZI and the instruction information IIb included in the wireless signal as the information related to the control of the release of the lock 21, the DKECU 30 can control the release of the lock 21 in the lock device 40.

There is provided the DKECU 30 according to the present embodiment that is the determination device for receiving a wireless signal transferred via radio waves from the wireless terminal 10 by the receiving antennas 20a to 20e, and determining a shielded state of the wireless terminal 10 based on radio wave strength at the receiving antennas 20a to 20e of the wireless signal, the device including: the DK acquisition unit 30a that acquires the strength information RI on the radio wave strength of the wireless signal received by the receiving antennas 20a to 20e; and the DK execution unit 30b that executes the shielded state determining process of determining a shielded state of the wireless terminal 10, in which, in the shielded state determining process, the DK execution unit 30b analyzes appearance frequency distribution of the radio wave strength based on the strength information RI, and determines that the wireless terminal 10 is in a shielded state of being shielded by the shielding body at least in a case where the shape of the appearance frequency distribution is a reference shape, analyzes the appearance frequency distribution of the radio wave strength based on the strength information RI, and determines that the wireless terminal 10 is in a shielded state of being shielded by the shielding body in a case where the shape of the appearance frequency distribution is not the reference shape and in a case where it is specified based on the strength information RI that the radio wave strength at the receiving antennas 20a to 20e exceeds the first reference amount α1 and deteriorates, and analyzes the appearance frequency distribution of the radio wave strength based on the strength information RI, and determines that the wireless terminal 10 is not in a shielded state of being shielded by the shielding body in a case where the shape of the appearance frequency distribution is not the reference shape and in a case where it is not specified based on the strength information RI that the radio wave strength at the receiving antenna exceeds the first reference amount and deteriorates. According to such a configuration, the DKECU 30 can determine whether or not the wireless terminal 10 that transmits the wireless signal is in a shielded state of being shielded by the shielding body.

There is provided the shielded state determining process Sa according to the present embodiment that is the determination method for receiving a wireless signal transferred via radio waves from the wireless terminal 10 by the receiving antennas 20a to 20e, and determining a shielded state of the wireless terminal 10 based on radio wave strength at the receiving antennas 20a to 20e of the wireless signal, the method including: a step of acquiring the strength information RI on the radio wave strength of the wireless signal received by the receiving antennas 20a to 20e, by the DK acquisition unit 30a; and a step of executing the shielded state determining process of determining a shielded state of the wireless terminal 10, by the DK execution unit 30b, in which, in the shielded state determining process, the DK execution unit 30b analyzes appearance frequency distribution of the radio wave strength based on the strength information RI, and determines that the wireless terminal 10 is in a shielded state of being shielded by the shielding body at least in a case where the shape of the appearance frequency distribution is a reference shape, analyzes the appearance frequency distribution of the radio wave strength based on the strength information RI, and determines that the wireless terminal 10 is in a shielded state of being shielded by the shielding body in a case where the shape of the appearance frequency distribution is not the reference shape and in a case where it is specified based on the strength information RI that the radio wave strength at the receiving antennas 20a to 20e exceeds the first reference amount α1 and deteriorates, and analyzes the appearance frequency distribution of the radio wave strength based on the strength information RI, and determines that the wireless terminal 10 is not in a shielded state of being shielded by the shielding body in a case where the shape of the appearance frequency distribution is not the reference shape and in a case where it is not specified based on the strength information RI that the radio wave strength at the receiving antenna exceeds the first reference amount and deteriorates. According to such a configuration, in the shielded state determining process, it is possible to determine whether or not the wireless terminal 10 that transmits the wireless signal is in a shielded state of being shielded by the shielding body.

Although the examples of the embodiments of the present invention have been described above, the present invention is not limited to the examples of the embodiments, and even when there are changes or additions within the range not departing from the gist of the present invention, it is needless to say that the changes or additions are included in the present invention.

REFERENCE SIGNS LIST

1: Automobile
10: Wireless terminal
20: In-vehicle ECU
20a to 20e: Receiving antenna
21: Lock
30: DKECU
30a: DK acquisition unit
30b: DK execution unit
40: Lock device
40a: Information acquisition unit
40b: Unlocking execution unit
100: Unlocking system

The invention claimed is:

1. An unlocking system (100) that receives a wireless signal transferred via radio waves from a wireless terminal (10) by antennas (20a to 20e) and controls release of a lock (21) based on the wireless signal, the system comprising:
    an acquisition unit (30a) that acquires strength information (RI) on strength of radio waves of the wireless signal received by the antennas (20a to 20e); and
    execution units (30b, 40b) that execute an unlocking process of controlling the release of the lock (21), wherein
    in the unlocking process, the execution units (30b, 40b) acquire shielding information (SI) on a shielded state of the wireless terminal (10) based on the strength information (RI), wherein the execution units (30b, 40b) analyze an appearance frequency distribution of radio wave strength based on the strength information (RI), when a shape of the appearance frequency distribution is a reference shape, and the execution units (30b, 40b) execute control for releasing the lock (21) based on strength information (RIc) corrected by using the shielding information (SI) corresponding to the shielded state where the wireless terminal (10) is shielded by a shielding body,
    in the correction process, the execution units (30b, 40b) acquire a correction data set in a predetermined region of a storage unit of a control device (30), and the strength information (RI) acquired by the acquisition unit (30a) is corrected using the correction data set, wherein the correction data set includes a ratio of the strength information (RI) measured in a first shielded state to the strength information (RI) measured in a second shielded state mapped for each of the antennas (20a to 20e), and
    in the unlocking process, the execution units (30b, 40b) acquire region information (ZI) on a region where the wireless terminal (10) is positioned based on the strength information (RIc) corrected using the shielding information (SI), and executes control for releasing the lock (21) based on the region information (ZI).

2. The unlocking system according to claim 1, wherein
in the unlocking process, the execution unit (30b) analyzes appearance frequency distribution of the strength information (RI) and acquires the shielding information (SI) based on a shape of the appearance frequency distribution.

3. The unlocking system according to claim 1, wherein
in the unlocking process, the execution unit (30b) analyzes a time change of the strength information (RI) at the antennas (20a to 20e), and acquires the shielding information (SI) based on a time change amount of the strength information (RI).

4. The unlocking system according to claim 1, wherein
the antennas (20a to 20e) include a first antenna (20a) and second antennas (20b to 20e) having radio wave receiving environments different from that of the first antenna, and in the unlocking process, the execution unit (30b) acquires the shielding information (SI) based on a difference between the strength information (RI) in the first antenna (20a) and the strength information (RI) in the second antennas (20b to 20e).

5. The unlocking system according to claim 1, wherein
in the unlocking process, the execution unit (30b) analyzes appearance frequency distribution of radio wave strength based on the strength information (RI), and in a case where a shape of the appearance frequency distribution is a reference shape, the execution unit (30b) corrects the strength information (RI) by using the shielding information (SI) corresponding to the shielded state where the wireless terminal (10) is shielded by a shielding body.

6. The unlocking system according to claim 1, wherein
in the unlocking process, the execution unit (30b) analyzes appearance frequency distribution of radio wave strength based on the strength information (RI), and in a case where a shape of the appearance frequency distribution is not a reference shape and it is specified based on the strength information (RI) that the radio wave strength at the antennas (20a to 20e) exceeds a first reference amount ($\alpha 1$) and deteriorates, the execution unit (30b) corrects the strength information (RI) by using the shielding information (SI) corresponding to the shielded state where the wireless terminal (10) is shielded by a shielding body.

7. The unlocking system according to claim 1, wherein
the shielding body is an owner (U) of the wireless terminal (10), and
the shielding information (SI) corresponding to the shielded state where the wireless terminal (10) is shielded by the shielding body is information corresponding to the shielded state where the wireless terminal (10) is shielded by the owner (U) of the wireless terminal (10).

8. A control method of an unlocking system (100) that receives a wireless signal transferred via radio waves from a wireless terminal (10) by antennas (20a to 20e) and controls release of a lock (21) based on the wireless signal, the method comprising:
a step of acquiring strength information (RI) on radio wave strength of the wireless signal received by the antennas (20a to 20e), by an acquisition unit (30a); and
a step of executing an unlocking process of controlling the release of the lock (21), by execution units (30b, 40b), wherein
in the unlocking process, the execution units (30b, 40b) acquire shielding information (SI) on a shielded state of the wireless terminal (10) based on the strength information (RI), and execute control for releasing the lock (21) based on strength information (RIc) corrected by using the shielding information (SI) corresponding to the shielded state where the wireless terminal (10) is shielded by a shielding body,
in the unlocking process, the execution unit (30b) analyzes an appearance frequency distribution of radio wave strength based on the strength information (RI), when a shape of the appearance frequency distribution is a reference shape,
in the correction process, the execution units (30b, 40b) acquire a correction data set in a predetermined region of a storage unit of a control device (30), and the strength information (RI) acquired by the acquisition unit (30a) is corrected using the correction data set, wherein the correction data set includes a ratio of the strength information (RI) measured in a first shielded state to the strength information (RI) measured in a second shielded state mapped for each of the antennas (20a to 20e), and
in the unlocking process, the execution units (30b, 40b) acquire region information (ZI) on a region where the wireless terminal (10) is positioned based on the strength information (RIc) corrected using the shielding information (SI), and executes control for releasing the lock (21) based on the region information (ZI).

9. A control device (30) that controls release of a lock (21) based on a wireless signal transmitted from a wireless terminal (10), transferred via radio waves, and received by antennas (20a to 20e), the device comprising:
an acquisition unit (30a) that acquires strength information (RI) on radio wave strength of the wireless signal received by the antennas (20a to 20e); and
an execution unit (30b) that executes an unlocking process of controlling the release of the lock (21), wherein
in the unlocking process, the execution unit (30b) acquires shielding information (SI) on a shielded state of the wireless terminal (10) based on the strength information (RI), and executes control for outputting information related to control of the release of the lock (21) based on strength information (RIc) corrected by using the shielding information (SI) corresponding to the shielded state where the wireless terminal (10) is shielded by a shielding body,
in the unlocking process, the execution unit (30b) analyzes an appearance frequency distribution of radio wave strength based on the strength information (RI), when a shape of the appearance frequency distribution is a reference shape,
in the correction process, the execution units (30b, 40b) acquire a correction data set in a predetermined region of a storage unit of a control device (30), and the strength information (RI) acquired by the acquisition unit (30a) is corrected using the correction data set, wherein the correction data set includes a ratio of the strength information (RI) measured in a first shielded state to the strength information (RI) measured in a second shielded state mapped for each of the antennas (20a to 20e), and
in the unlocking process, the execution units (30b, 40b) acquire region information (ZI) on a region where the wireless terminal (10) is positioned based on the strength information (RIc) corrected using the shielding information (SI), and executes control for releasing the lock (21) based on the region information (ZI).

10. A control method of a control device (30) that controls release of a lock (21) based on a wireless signal transmitted from a wireless terminal (10), transferred via radio waves, and received by antennas (20a to 20e), the method comprising:
  a step of acquiring strength information (RI) on radio wave strength of the wireless signal received by the antennas (20a to 20e), by an acquisition unit (30a); and
  a step of executing an unlocking process of controlling the release of the lock (21), by an execution unit (30b), wherein
  in the unlocking process, the execution unit (30b) acquires shielding information (SI) on a shielded state of the wireless terminal (10) based on the strength information (RI), and executes control for outputting information related to control of the release of the lock (21) based on strength information (RIc) corrected by using the shielding information (SI) corresponding to the shielded state where the wireless terminal (10) is shielded by a shielding body,
  in the unlocking process, the execution unit (30b) analyzes an appearance frequency distribution of radio wave strength based on the strength information (RI), when a shape of the appearance frequency distribution is a reference shape,
  in the correction process, the execution units (30b, 40b) acquire a correction data set in a predetermined region of a storage unit of a control device (30), and the strength information (RI) acquired by the acquisition unit (30a) is corrected using the correction data set, wherein the correction data set includes a ratio of the strength information (RI) measured in a first shielded state to the strength information (RI) measured in a second shielded state mapped for each of the antennas (20a to 20e), and
  in the unlocking process, the execution units (30b, 40b) acquire region information (ZI) on a region where the wireless terminal (10) is positioned based on the strength information (RIc) corrected using the shielding information (SI), and executes control for releasing the lock (21) based on the region information (ZI).

11. A determination device (30) for receiving a wireless signal transferred via radio waves from a wireless terminal (10) by antennas (20a to 20e), and determining a shielded state of the wireless terminal (10) based on radio wave strength at the antennas (20a to 20e) of the wireless signal, the device comprising:
  an acquisition unit (30a) that acquires strength information (RI) on the radio wave strength of the wireless signal received by the antennas (20a to 20e); and
  an execution unit (30b) that executes a determining process of determining the shielded state of the wireless terminal (10), wherein
  in the determining process, the execution unit (30b)
    analyzes an appearance frequency distribution of the radio wave strength based on the strength information (RI), and determines that the wireless terminal (10) is in the shielded state of being shielded by a shielding body when a shape of the appearance frequency distribution is a reference shape,
    analyzes the appearance frequency distribution of the radio wave strength based on the strength information (RI), and determines that the wireless terminal (10) is in the shielded state of being shielded by the shielding body in a case where the shape of the appearance frequency distribution is not the reference shape and in a case where it is specified based on the strength information (RI) that the radio wave strength at the antennas (20a to 20e) exceeds a first reference amount ($\alpha 1$) and deteriorates, and
    analyzes the appearance frequency distribution of the radio wave strength based on the strength information (RI), and determines that the wireless terminal (10) is not in the shielded state of being shielded by the shielding body in a case where the shape of the appearance frequency distribution is not the reference shape and in a case where it is not specified based on the strength information (RI) that the radio wave strength at the antenna exceeds the first reference amount and deteriorates, and
  in a correction process, the execution unit (30b) acquires a correction data set in a predetermined region of a storage unit of the determination device (30), and the strength information (RI) acquired by the acquisition unit (30a) is corrected using the correction data set, wherein the correction data set includes a ratio of the strength information (RI) measured in a first shielded state to the strength information (RI) measured in a second shielded state mapped for each of the antennas (20a to 20e).

12. A determination method for receiving a wireless signal transferred via radio waves from a wireless terminal (10) by antennas (20a to 20e), and determining a shielded state of the wireless terminal (10) based on radio wave strength at the antennas (20a to 20e) of the wireless signal, the method comprising:
  a step of acquiring strength information (RI) on the radio wave strength of the wireless signal received by the antennas (20a to 20e), by an acquisition unit (30a); and
  a step of executing a shielded state determining process of determining the shielded state of the wireless terminal (10), by an execution unit (30b), wherein
  in the shielded state determining process, the execution unit (30b)
    analyzes an appearance frequency distribution of the radio wave strength based on the strength information (RI), and determines that the wireless terminal (10) is in the shielded state of being shielded by a shielding body when a shape of the appearance frequency distribution is a reference shape,
    analyzes the appearance frequency distribution of the radio wave strength based on the strength information (RI), and determines that the wireless terminal (10) is in the shielded state of being shielded by the shielding body in a case where the shape of the appearance frequency distribution is not the reference shape and in a case where it is specified based on the strength information (RI) that the radio wave strength at the antennas (20a to 20e) exceeds a first reference amount ($\alpha 1$) and deteriorates, and
    analyzes the appearance frequency distribution of the radio wave strength based on the strength information (RI), and determines that the wireless terminal (10) is not in the shielded state of being shielded by the shielding body in a case where the shape of the appearance frequency distribution is not the reference shape and in a case where it is not specified based on the strength information (RI) that the radio wave strength at the antenna exceeds the first reference amount and deteriorates, and
  in a correction process, the execution unit (30b) acquires a correction data set in a predetermined region of a storage unit of a determination device (30), and the strength information (RI) acquired by the acquisition unit (30a) is corrected using the correction data set, wherein the correction data set includes a ratio of the strength information (RI) measured in a first shielded state to the strength information (RI) measured in a second shielded state mapped for each of the antennas (20*a* to 20*e*).

* * * * *